United States Patent Office 2,795,638
Patented June 11, 1957

2,795,638

SILVER PEROXIDE ELECTRODES

Adolph Fischbach, Elberon Park, N. J., assignor to the United States of America as represented by the Secretary of the Army No Drawing. Application September 2, 1954,
Serial No. 453,973

4 Claims. (Cl. 136—120)

(Granted under Title 35, U. S. Code (1952), sec. 266)

The invention described herein may be manufactured and used by or for the Government for governmental purposes without the payment of any royalty thereon.

This invention relates to improved electrodes of silver peroxide that are used as depolarizer electrodes usually together with zinc as the negative electrode and with a solution of potassium hydroxide as the electrolyte.

Silver peroxide batteries have found important applications in electronic equipment, guided missiles, etc. due to their large watt output per unit of weight and volume and their nearly constant voltage at very high discharge rates which make such batteries best adapted to continuous high discharge of short duration. Such "one-shot" batteries may be used both as "reserve" and as "non-reserve" type batteries.

The reserve type silver peroxide battery may be kept dry for indefinite periods. They are activated by being filled with or being immersed in an appropriate electrolyte whenever they are needed for service. Certain applications of silver peroxide batteries do not admit of reserve type batteries because the implements for which they are intended (e. g., guided missiles) must be kept under conditions which allow immediate release at a moment's notice. The batteries to be used for such purposes cannot be of the deferred action or reserve type because it may take up to thirty minutes to fill reserve type batteries with the necessary electrolyte and allow them to attain peak voltage. In such cases only non-reserve type batteries can be used provided that they are capable of keeping their full charge for a considerable time, that is, at least for four to six months.

In spite of their otherwise excellent properties silver peroxide batteries show considerable disadvantages if used as non-reserve type batteries. Silver peroxide batteries after activation with electrolyte may lose up to about 35 percent or more of their capacity during the first week which greatly impairs their usefulness as special purpose batteries in such implements as guided missiles and the like.

The present invention is based on the discovery of the main causes of this rapid deterioration on standing. It has been found that silver peroxide, being a strong oxidizing agent exerts a strong chemical action on the surface of the separator which conventionally consists of an organic material such as cellulose or other organic high polymers. The surface of the separator becomes charred and pin holes develop within its structure. The metallic silver resulting from the reducing action of the organic material on the silver peroxide becomes imbedded in the charred surface of the separator material and also fills up the pin holes. As a consequence, the separator has been made at least partly electronically conductive thus short-circuiting the electrodes. At the same time the physical strength of the separator is considerably reduced which may lead to mechanical breakdowns.

I have now found that all these disadvantages may be overcome by a very simple and inexpensive method which does not interfere with the conventional mass-production methods of manufacturing silver peroxide electrodes. Briefly stated, my new method consists in producing a very thin protective coating on the surface of the silver peroxide electrode by reducing the uppermost surface layer of the silver peroxide with the aid of chemical reducing agents such as the conventional photographic developer, aqueous solutions of formaldehyde, or the like solutions having a reducing action on silver peroxide.

The invention will become more apparent from the following description of specific embodiments of the broad inventive idea.

To produce a protecting coating on any conventional silver peroxide plate electrode, a diluted solution of one of the following commercially available photographic developers may, for instance, be used: p-methylaminophenol sulfate known under the trade names Photol, or Metol; diaminophenol hydrochloride known under the trade name Amidol; or pyrogallol.

Satisfactory results have been attained with aqueous solutions of other chemical substances, e. g., formaldehyde, known to reduce silver peroxide to either silver monoxide or to metallic silver or to a mixture of both. Silver monoxide has practically no oxidizing effect on the material of the separator; silver peroxide electrodes covered with a film of silver monoxide proved to have a satisfactory shelf-life.

To produce the protective coating the silver peroxide electrode is dipped for a very short time, for instance, three to five seconds in the aqueous solution of one of the above-mentioned reducing solutions. To prevent deeper penetration of the porous silver peroxide plate by the reducing solution, it is advantageous to wet a thin sheet of paper or other cellulosic materials with the reducing solution and cover the surface of the silver peroxide plates for a short time with the wetted sheets. Preferably, the sheets to be wetted may consist of the same material as the separator plates, that is, Webril, Viskon or other conventional separator materials. Ordinary blotting paper or filter paper may, of course, also be used. The protective coating produced on the silver peroxide plate should be thick enough to protect it from the action by the separator and yet thin enough so that the discharge characteristics of the battery are not adversely affected.

Batteries made with silver peroxide plates that have been treated according to the methods of the present invention show a marked improvement of their charge retention in the activated state. Their shelf-life is adequate for most practical purposes.

It will be understood by those skilled in the art that many variations and combinations are possible within the broad idea as characterized in the following claims.

What is claimed is:

1. Method of improving the shelf-life characteristics of batteries using silver peroxide electrodes comprising producing a very thin protective coating on the surface of the silver peroxide electrode by dipping the silver peroxide electrode for a few seconds into a solution of a chemical reducing agent selected from the group consisting of photographic developers and formaldehyde, thereby reducing the uppermost surface layer of the silver peroxide of said electrode.

2. Method of improving the shelf-life characteristics of batteries according to claim 1 in which the silver peroxide electrodes are dipped for a few seconds into a diluted solution of a photographic developer.

3. Method of improving the shelf-life characteristics of batteries according to claim 1 in which the silver peroxide electrode is dipped for a few seconds into a diluted aqueous solution of formaldehyde.

4. Method of improving the shelf-life characteristics of batteries according to claim 1 comprising wetting a porous sheet of cellulosic material with a solution of a chemical reducing agent, placing said wetted sheet over the surface of said silver peroxide plate and removing this wetted sheet as soon as a very thin protective coating of reduced silver peroxide has been formed.

References Cited in the file of this patent

UNITED STATES PATENTS

| | | |
|---|---|---|
| 2,594,714 | Andre | Apr. 29, 1952 |
| 2,610,219 | Yardeny | Sept. 9, 1952 |
| 2,669,594 | Andre | Feb. 16, 1954 |